(12) United States Patent
Roy et al.

(10) Patent No.: US 7,589,928 B2
(45) Date of Patent: Sep. 15, 2009

(54) MAGNETIC RECORDING DEVICE INCLUDING A THERMAL PROXIMITY SENSOR

(75) Inventors: Mallika Roy, Edina, MN (US); Kaizhong Gao, Eden Prairie, MN (US); Insik Jin, Eagan, MN (US); William Bruce Fitzpatrick, Prior Lake, MN (US); Housan S. Dakroub, Dearborn Heights, MI (US); Sining Mao, Eden Prairie, MN (US); Song S. Xue, Edina, MN (US); Jeffrey Howard Lake, Bloomington, MN (US); Dadi Setiadi, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/724,739

(22) Filed: Mar. 16, 2007

(65) Prior Publication Data
US 2008/0225426 A1 Sep. 18, 2008

(51) Int. Cl.
*G11B 21/02* (2006.01)
(52) U.S. Cl. .......................................... 360/75; 360/69
(58) Field of Classification Search ........................ None
See application file for complete search history.

(56) References Cited

U.S. PATENT DOCUMENTS

| | | | |
|---|---|---|---|
| 5,130,866 A | 7/1992 | Klaassen et al. | |
| 5,527,110 A | 6/1996 | Abraham et al. | |
| 5,753,803 A | 5/1998 | Abraham et al. | |
| 5,810,477 A | 9/1998 | Abraham et al. | |
| 5,850,374 A | 12/1998 | Abraham et al. | |
| 6,052,249 A | 4/2000 | Abraham et al. | |
| 6,071,007 A | 6/2000 | Schaenzer et al. | |
| 6,262,572 B1 | 7/2001 | Franco et al. | |
| 6,952,330 B1 | 10/2005 | Riddering et al. | |
| 6,975,472 B2 | 12/2005 | Stover et al. | |
| 6,980,399 B2 | 12/2005 | Rajakumar et al. | |
| 7,030,875 B2 | 4/2006 | Gupta et al. | |
| 7,054,084 B2 | 5/2006 | Fong et al. | |
| 2003/0058559 A1* | 3/2003 | Brand et al. | 360/31 |
| 2007/0230020 A1* | 10/2007 | Leis | 360/75 |
| 2007/0268608 A1* | 11/2007 | Takahashi | 360/75 |
| 2008/0112076 A1* | 5/2008 | Biskeborn | 360/122 |

* cited by examiner

*Primary Examiner*—Jason C Olson
(74) *Attorney, Agent, or Firm*—Kinney & Lange PA

(57) ABSTRACT

A system includes a magnetic device for writing to and reading from a magnetic medium and a sensor disposed adjacent to the magnetic device and proximate to the magnetic medium. The sensor generates signals related to thermal variations in the sensor caused by changes in a distance between the magnetic device and the magnetic medium.

20 Claims, 6 Drawing Sheets

MAGNETIC RECORDING DEVICE INCLUDING A THERMAL PROXIMITY SENSOR

BACKGROUND OF THE INVENTION

The present invention relates to magnetic devices. More particularly, the present invention relates to managing the head-to-medium spacing (HMS) in a recording system using thermal proximity measurement.

In magnetic recording systems, a rapid increase in the areal density of magnetic media has led to reduction of the spacing between the head and the medium down to less than 10 nm. Maintaining a constant head-to-medium spacing (HMS) is important throughout the life of the magnetic recording system, since the close proximity of the head to the medium makes the drive susceptible to reliability issues that could lead to temporary modulation of the HMS. Most conventional recording systems do not provide reliable approaches to monitoring the HMS in-situ.

The difference in temperature between the head and the medium results in heat transfer during operation, which may be represented by:

$$q = \frac{K_a \Delta T}{h + \frac{cT}{p}} \quad \text{(Equation 1)}$$

where q is the amount of heat transferred between the head and the medium, h is the separation between the head and the medium, p is the pressure at the sensor, c is a constant that depends on the molecular properties of the air surrounding the head and the medium, T is the ambient temperature, $K_a$ is the conductivity of air, and $\Delta T$ is the difference in temperature between the head and the medium. Thus, because the amount of heat transferred between the head and the medium is proportional to $\Delta T$ and inversely proportional to h, the temperature at the medium confronting surface of the head may be measured to continuously monitor changes in the HMS.

Some conventional systems attempt to capitalize on this phenomenon by monitoring temperature changes in the reader of the head. However, in order to improve the detection sensitivity of the reader, the reader element had to be biased at a relatively high voltage to sense the change in resistance in the reader element caused by the temperature change. This can lead to compromised reader life and, because the reader is highly magnetoresistive, can also make it difficult to differentiate between the thermally and magnetically induced components of resistance change in the reader.

BRIEF SUMMARY OF THE INVENTION

The present invention relates to a system including a magnetic device for writing to and reading from a magnetic medium and a sensor disposed adjacent to the magnetic device and proximate to the magnetic medium. The sensor generates signals related to thermal variations in the sensor caused by changes in separation between the magnetic device and the magnetic medium.

DETAILED DESCRIPTION

Figure 1:
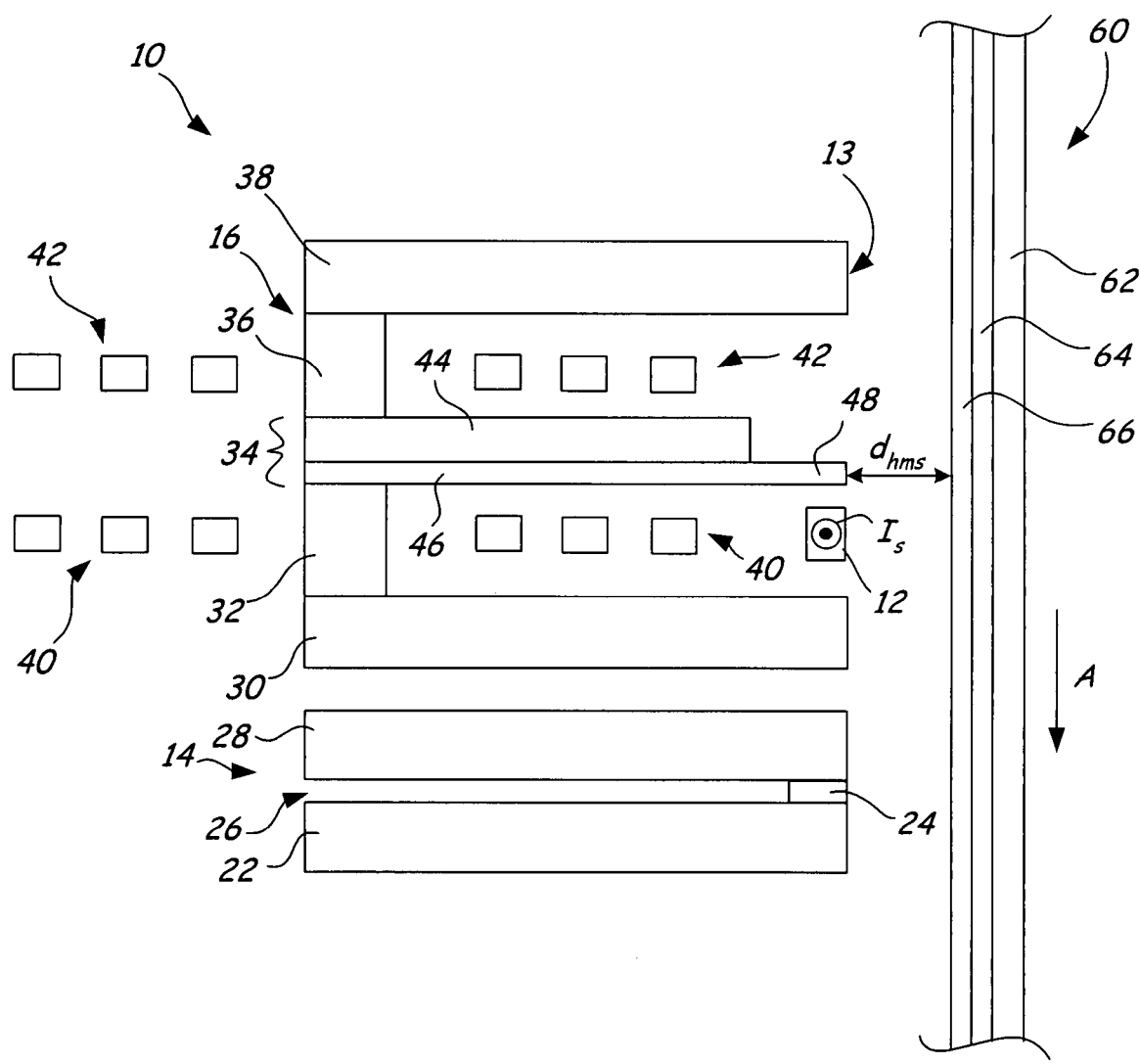
FIG. 1 is a cross-sectional view of a transducing head and a thermal proximity sensor disposed adjacent to the transducing head.

FIG. 1 is a cross-sectional view of transducing head 10 including thermal proximity sensor 12 to provide signals related to the head-to-medium spacing (HMS) of transducing head 10. Sensor 12 will be described in more detail with regard to FIGS. 2-6. Transducing head 10 includes reader 14 and writer 16 that define medium confronting surface 18. Reader 14 includes bottom shield structure 22, read element 24, read gap 26, and top shield structure 28. Writer 16 includes first return pole 30, first magnetic stud 32, main pole 34, second magnetic stud 36, second return pole 38, first conductive coil 40, and second conductive coil 42. Main pole 34 includes main pole body 44, yoke 46, and main pole tip 48.

Reader 14 and writer 16 are each multi-layered devices, and writer 16 is stacked on reader 14 in a piggyback configuration in which layers are not shared between the two elements. In other embodiments not illustrated, reader 14 and writer 16 may be arranged in a merged-head configuration (in which layers are shared between the two elements) and/or reader 14 may be formed on writer 16.

Read gap 26 is defined on medium confronting surface 13 between terminating ends of bottom shield 22 and top shield 28. Read element 24 is positioned in read gap 26 adjacent medium confronting surface 13. Read gap 26 insulates read element 24 from bottom shield 22 and top shield 28. Read element 24 may be any variety of different types of read elements, such as a tunneling magnetoresistive (TMR) read element or a giant magnetoresistive (GMR) read element. In operation, magnetic flux from a surface of magnetic medium 60 causes rotation of a magnetization vector of read element 24, which in turn causes a change in electrical resistivity of read element 24. The change in resistivity of read element 24 can be detected by passing a current through read element 24 and measuring a voltage across read element 24. Shields 22 and 28, which may be made of a soft ferromagnetic material, guide stray magnetic flux from medium layer 66 away from read element 24 outside the area of medium layer 66 directly below read element 24.

In writer 16, first return pole 30, second return pole 38, first magnetic stud 32, and second magnetic stud 36 may comprise soft magnetic materials, such as NiFe. Conductive coils 40 and 42 may comprise a material with low electrical resistance, such as Cu. Main pole body 44 may comprise a high moment soft magnetic material, such as CoFe. Yoke 46 may comprise a soft magnetic material, such as NiFe or CoNiFe, to improve the efficiency of flux delivery to main pole body 34. First conductive coil 40 surrounds first magnetic stud 32, which magnetically couples main pole 34 to first return pole 30. Second conductive coil 42 surrounds second magnetic stud 36, which magnetically couples main pole 34 to second return pole 38. First conductive coil 40 passes through the gap between first return pole 30 and main pole 34, and second conductive coil 42 passes through the gap between main pole 34 and second return pole 38.

Reader 14 and writer 16 are carried over the surface of magnetic medium 60, which is moved relative to transducing head 10 as indicated by arrow A such that main pole 34 leads first return pole 30, trails second return pole 38, and is used to physically write data to magnetic medium 60. In order to write data to magnetic medium 60, current is caused to flow through second conductive coil 42. The magnetomotive force in the coils causes magnetic flux to travel from main pole tip 48 perpendicularly through medium layer 66, across SUL 64, and through second return pole 38 and first magnetic stud 36 to provide a closed magnetic flux path. The direction of the write field at the medium confronting surface of main pole tip 48, which is related to the state of the data written to magnetic medium 60, is controllable based on the direction that the current flows through second conductive coil 30.

Stray magnetic fields from outside sources, such as a voice coil motor associated with actuation of transducing head 10 relative to magnetic medium 60, may enter SUL 64. Due to the closed magnetic path between main pole 34 and second return pole 38, these stray fields may be drawn into writer 16 by second return pole 38. In order to reduce or eliminate these stray fields, first return pole 30 is connected to main pole 34 via first magnetic stud 32 to provide a flux path for the stray magnetic fields. In addition, the strength of the write field through main pole 34 (due to current flowing through second conductive coil 42) may be augmented by causing current to flow through first conductive coil 40. The magnetomotive force in the coils causes magnetic flux to travel from main pole tip 48 perpendicularly through medium layer 66, across SUL 64, and through first return pole 30 and first magnetic stud 32 to provide a closed magnetic flux path. The direction of the current through first conductive coil 40 is opposite that of the current through conductive coil 42 to generate magnetic flux in the same direction through main pole 34. The effect of employing two return poles and two conductive coils is an efficient driving force to main pole 34, with a reduction on the net driving force on first return pole 30 and second return pole 38.

Writer 16 is shown merely for purposes of illustrating a construction that may be used in a transducing head 10 including sensor 12, and variations on the design may be made. For example, while main pole 34 includes main pole body 44 and yoke 46, main pole 34 can also be comprised of a single layer of magnetic material. In addition, a single trailing return pole may be provided instead of the shown dual return pole writer configuration. Also, a shield may additionally be formed to extend from first return pole 30 toward main pole 34 proximate medium confronting surface 13 in a "trailing shield" magnetic writer design. Furthermore, writer 16 is configured for writing data perpendicularly to magnetic medium 60, but writer 16 and magnetic medium 60 may also be configured to write data longitudinally.

Transducing head 10 confronts magnetic medium 60 at an air bearing surface (ABS). Magnetic medium 60 includes substrate 62, soft underlayer (SUL) 64, and medium layer 66. SUL 64 is disposed between substrate 62 and medium layer 66. Magnetic medium 60 is positioned proximate to transducing head 10 such that the surface of medium layer 66 opposite SUL 64 faces reader 14 and writer 16. Magnetic medium 60 is shown merely for purposes of illustration, and may be any type of medium that can be used in conjunction with transducing head 10, such as composite media, continuous/granular coupled (CGC) media, discrete track media, and bit-patterned media.

As will be described herein, sensor 12 is disposed at or near medium confronting surface 13 and provides signals related to thermal variations in sensor 12 caused by changes in separation $d_{hms}$ between transducing head 10 and magnetic medium 60. Sensor 12 may be made of a material having a high thermal coefficient of resistivity and low magnetoresistance at operating temperatures of transducing head 10 such that the resistance of sensor 12 is a function of its temperature. The change in resistance may be detected by passing a sensor current $I_S$ through sensor 12 and measuring the resulting voltage drop across sensor 12.

Figure 2:
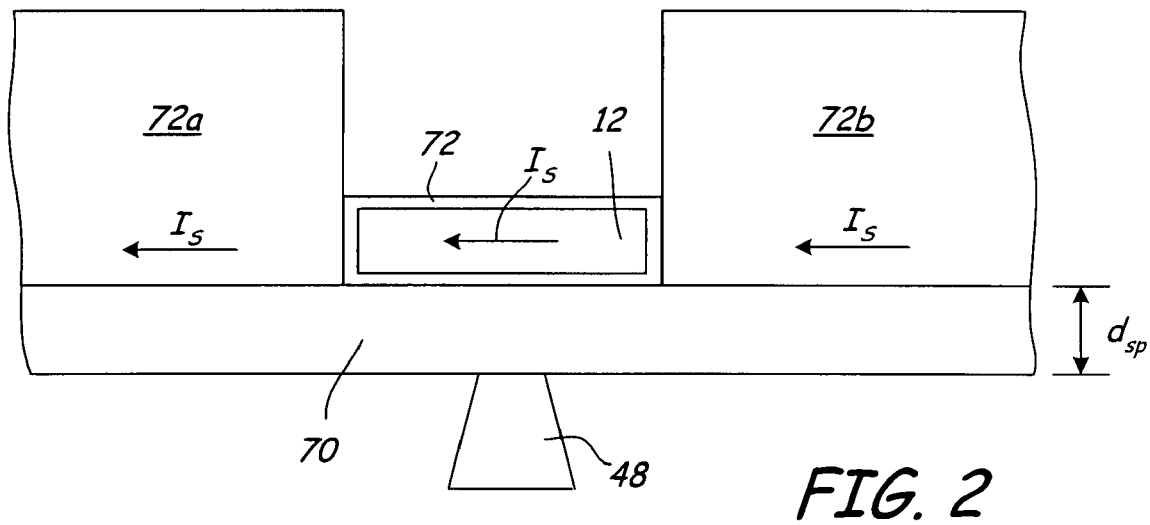
FIG. 2 is a medium confronting surface view of a write element tip and the thermal proximity sensor for monitoring the head-to-medium spacing of the transducing head.

FIG. 2 is a medium confronting surface view of main pole tip 48 and sensor 12 separated by insulating layer 70. In addition, FIG. 2 shows sensor 12 embedded in protective embedding material 72. Sensor current $I_S$, which may be alternating current or direct current, is delivered to sensor 12 by electrical contacts 72a and 72b, which are connected to a current source (not shown). Sensor current $I_S$ passes through sensor 12 parallel to medium confronting surface 13 and the trailing edge of main pole tip 48. The voltage drop across sensor 12 may be measured and monitored to detect changes in the HMS.

Insulating layer 70 is made of a material that prevents electrical and magnetic interactions between sensor 12 and main pole 34. Sensor 12 is placed proximate to main pole tip 48 to maximize the sensitivity of sensor 12 to the HMS of writer 16. However, sensor 12 is spaced from main pole tip 48 by distance $d_{sp}$, which is an effective distance to prevent data erasure or interference with the operation of writer 16. In some embodiments, distance $d_{sp}$ is at least 1.0 μm. In addition, sensor 12 may be made of a chemically inert material, such as Pt or Au, to prevent the risk of corrosion or oxidation of sensor 12 posed by positioning sensor 12 at medium confronting surface 13. Furthermore, damage due to smearing of sensor 12 at medium confronting surface 13 may be prevented or greatly reduced by embedding sensor 12 in embedding material 72 (e.g., Ta), which is a material less susceptible to the effects of exposure to the space between transducing head 10 and magnetic medium 60. Recessing sensor 12 from medium confronting surface 13 by a few nanometers may also prevent smearing of sensor 12. Embedding material 72 may alternatively cover sensor 12 at the medium confronting surface such that sensor 12 is encased in embedding material 72. Such measures have minimal affect on the sensitivity of sensor 12 since the thermal conductivity of metals is generally high.

The size of sensor 12 at medium confronting surface 13 may be minimized within design and operability constraints to consume less space within transducing head 10. A smaller sensor 12 also results in increased sensitivity to changes in the HMS due to a higher resistance across sensor 12 and a larger temperature variation for the same energy accumulated or dissipated.

While sensor 12 is shown disposed adjacent to a trailing edge of main pole tip 48 in FIGS. 1 and 2, it will be appreciated that sensor 12 may be alternatively located proximate to medium confronting surface 13 at other locations in transducing head 10. For example, sensor 12 may be located proximate to the trailing side of first return pole 30, the leading side of main pole 34, the trailing side of second return pole 38, or the leading side of second return pole 38. In addition, sensor 12 may be disposed adjacent to reader 14. This flexibility in the location of sensor 12 is important in configurations of transducing head 10, such as the trailing shield design described above, that include a device component between first return pole 30 and main pole 34.

Sensor 12 as described is simple and cost-effective to fabricate and, since the detection of changes in the resistance across sensor 12 is based on electrical measurement, the magnetic fields generated by adjacent structures have a minimal effect on the operation of sensor 12. Also, the response time of sensor 12 to changes in HMS is very high, so variations in HMS can be detected very quickly. Consequently, sensor 12 may be employed to not only detect changes in HMS, but also to sense the presence of asperities on magnetic medium 60, map the topography of magnetic medium 60, and provide real-time control of the HMS by incorporating feedback control of the HMS based on signals from sensor 12.

Figure 3:
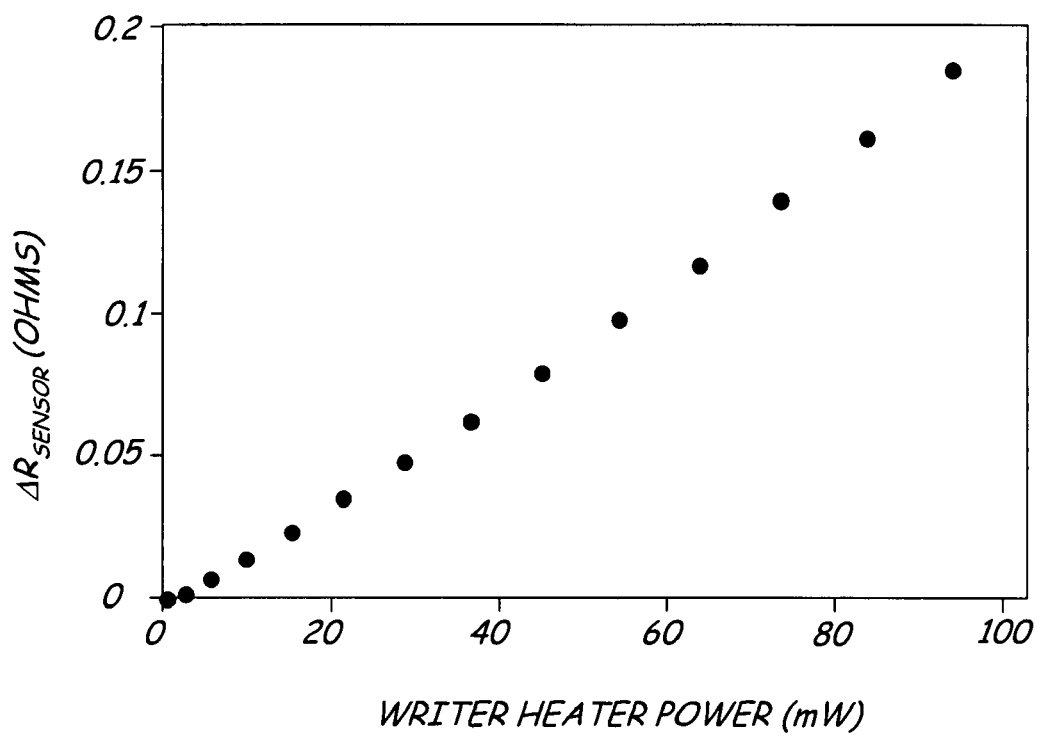
FIG. 3 is a graph of the difference in on-medium and off-medium resistance of the thermal proximity sensor as a function of an applied writer heater power.

In order to show the effect of changes in HMS on sensor 12, FIG. 3 is a graph of the difference in off-medium and on-medium resistance of sensor 12 as a function of an applied writer heater power. The writer heater is thermally coupled to main pole tip 48 such that, when different levels of power are applied to the writer heater, variations in HMS occur due to changes in the contours of main pole tip 48 (sometimes referred to as thermal tip protrusion). The on-medium and off-medium resistance is measured to compensate for any change in resistance induced by variations in ambient conditions (e.g., ambient temperature). In the simulated device, sensor 12 was made of gold. The applied writer heater power results in an increase in the temperature of main pole tip 48, which produces a decrease in the HMS of transducing head 10. As the HMS decreases with increasing writer heater power, heat is transferred more efficiently between sensor 12 and magnetic medium 60, and the on-medium resistance of sensor 12 decreases relative to the off-medium resistance, as shown in FIG. 3.

Figure 4:
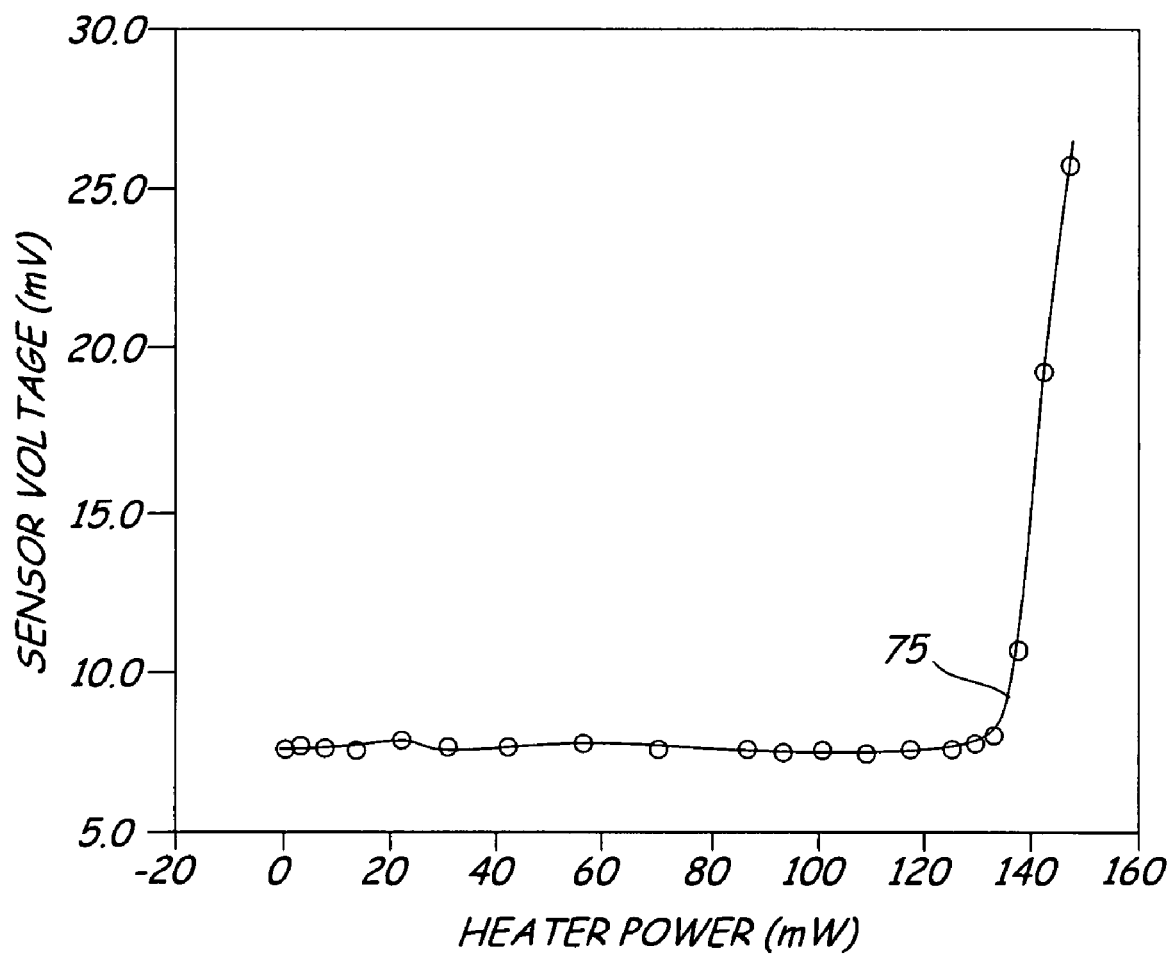
FIG. 4 is a graph showing the effect on the sensor when the writer heater power is increased until contact is made between the transducing head and the magnetic medium.

Sensor 12 may be calibrated to precisely determine the clearance of transducing head 10. This may be done prior to use to determine an initial clearance of transducing head 10, as well as in-situ when conditions within the magnetic recording system change the HMS over time. The clearance may be determined by increasing the applied writer heater power until transducing head 10 contacts magnetic medium 60 (i.e., separation $d_{hms}$ equals 0). FIG. 4 is a graph showing the effect on sensor 12 when the writer heater power is increased until contact is made between transducing head 10 and magnetic medium 60. In particular, line 75 shows the peak-to-peak voltage across sensor 12 as a function of the applied writer heater power. To determine the clearance, the applied writer heater power when transducing head 10 contacts magnetic medium 60 is noted. This occurs when the voltage across sensor 12 begins to sharply increase (about 125 mW in FIG. 4). The writer heater power is then reduced from the noted heater power at the point of contact to set the clearance of transducing head 10. When setting the clearance, the time transducing head 10 is in contact with magnetic medium 60 is minimized to prevent damage to transducing head 10. Sensor 12 has a high signal-to-noise ratio response even when the time in contact is very short and the level of contact interference is low.

The $n^{th}$ harmonic of a read back signal applied to sensor 12 changes as the HMS changes according to Wallace's loss equation:

$$V(y+\Delta y)=V(y)e^{-nk\Delta y} \quad \text{(Equation 2),}$$

where k is the spatial frequency of the applied signal and $\Delta y$ is the change in the HMS. For a signal with wavelength $\lambda$, the change in HMS, which can be used to set the writer heater power and ensure the clearance is set to the desired value, is given by:

$$\Delta y = \frac{\lambda}{54.6n}\Delta V(\text{dB}). \quad \text{(Equation 3)}$$

Various measures may be taken to improve the sensitivity of sensor 12 to changes in the HMS. For example, placing sensor 12 at or near medium confronting surface 13 increases the response of sensor 12 to changes in the HMS. In addition, as indicated by Equation 1, the detection sensitivity may be improved by increasing the temperature between transducing head 10 and magnetic medium 60. In current magnetic recording systems, the HMS is less than 100 Å, which are dimensions that result in heat transfer between transducing head 10 and magnetic medium 60 being dominated by ballistic transfer. The temperature of transducing head 10 may be increased by either increasing the amplitude of sense current $I_S$ provided through sensor 12, or by adding an additional heat source proximate to sensor 12. Also, sensitivity may be further increased by removing heat sinks or positioning heat sinks further from sensor 12 to ensure that heat is dissipated primarily through magnetic medium 60.

FIGS. 5A-5D are schematic illustrations of configurations for incorporating a sensor heater 80 with the sensor 12 to increase the temperature (and thus, the sensitivity) of sensor 12. In the embodiments shown, sensor 12 is disposed at medium confronting surface 13 and sensor heater 80 is disposed adjacent to sensor 12 on a side opposite medium confronting surface 13. Sensor heater 80 is arranged relative to sensor 12 such that they are structurally aligned substantially parallel to each other. In addition, sensor heater 80 is separated from sensor 12 by an insulating material (not shown). It will appreciated that while a single sensor heater 80 is shown in each of the circuits of FIGS. 5A-5D, a plurality of heaters 80 may alternatively be connected in series with each other.

As sensor 12 and sensor heater 80 are moved relative to magnetic medium 60, sensor heater 80 dissipates thermal energy by conducting through the insulating material, through sensor 12, through medium confronting surface 13 into the space between transducing head 10 and magnetic medium 60, and finally into magnetic medium 60. The current through sensor heater 80 is set such that sensor 12 has a maximum temperature dependent resistance change at a normal operating HMS.

Figure 5A:
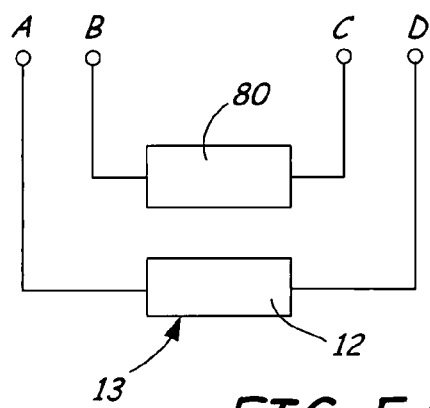
FIGS. 5A-5D are schematic views of configurations for incorporating a sensor heater with the thermal proximity sensor.

FIG. 5A shows an embodiment of sensor heater 80 positioned relative to sensor 12 in which sensor 12 receives sense current $I_S$ via connection pads A and D, while sensor heater 80 is biased via connection pads B and C. By providing biasing via separate connection pads, sensor 12 and sensor heater 80 may be biased with separate currents, which allows for independent control of the biasing of these elements. In addition, there is no resistance interaction component in the output signal from sensor 12 since sensor heater 80 is provided on a separate biasing circuit.

Figure 5B:
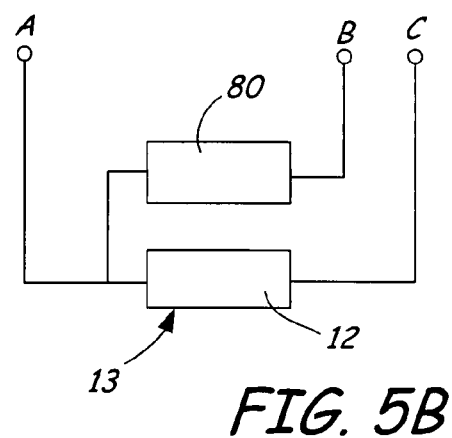

In order to reduce the number of connection pads necessary for the incorporation of sensor heater 80 with sensor 12, sensor 12 and sensor heater 80 may share connections to the biasing current. For example, FIG. 5B shows a configuration that includes three connection pads A, B, and C (i.e., one additional pad compared to a system without sensor heater 80). In this configuration, both sensor 12 and sensor heater 80 are connected to connection pad A (which may be a common or grounded node), while the other end of sensor heater 80 is connected to connection pad B and the other end of sensor 12 is connected to connection pad C. Similar to the embodiment shown in FIG. 5A, sensor 12 and sensor heater 80 may be biased with separate currents, which allows for independent control of the biasing of these elements. In addition, there is no resistance interaction component in the output signal from sensor 12 since sensor heater 80 is provided on a separate biasing circuit. Furthermore, for very high frequency response signals, the three-connection configuration provides the capability to route a common or ground circuit near the connection wires to achieve improved control of electrical signal transmission properties and improved noise immunity in the presence of any environmental common mode electrical interference.

Figure 5C:
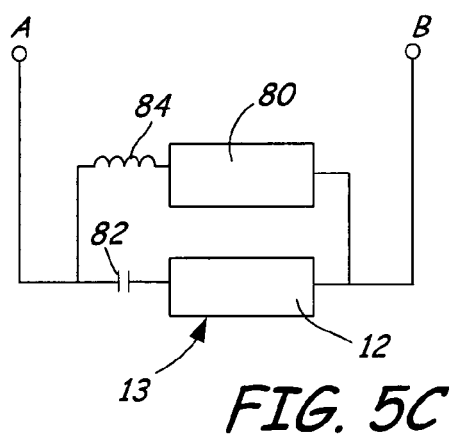
Figure 5D:
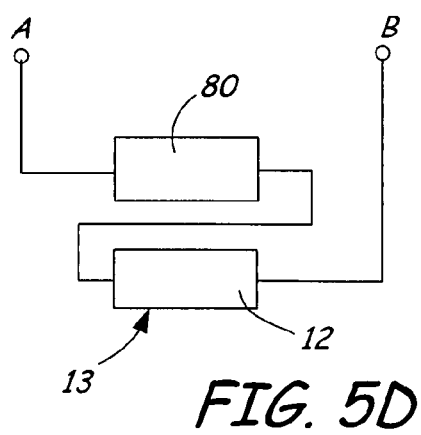

Sensor 12 and sensor heater 80 may also be connected in configurations that include two connection pads A and B, such as the configurations shown in FIGS. 5C and 5D, to utilize the same biasing current source for both sensor 12 and sensor heater 80. In FIG. 5C, sensor 12 and sensor heater 80 are connected in parallel. The magnitude of the biasing current that flows to each of sensor 12 and sensor heater 80 may be controlled by selecting resistance values of each of the components. For example, if sensor heater 80 has a resistance of 50Ω and sensor 12 has a normal operating temperature resistance of 200Ω, 80% of the biasing current flows though sensor heater 80 while 20% of the biasing current flows through sensor 12. Consequently, the level of heating provided by sensor heater 80 can be controlled by the relative resistances of sensor 12 and sensor heater 80.

Capacitor 82 and inductor 84 are also shown in the circuit of FIG. 5C. Capacitor 82 is connected in series with sensor 12 and inductor 84 is connected in series with sensor heater 80. The capacitance of capacitor 82 may be increased using materials with higher dielectric values. With this configuration, sensor 12 may be operated in high frequency mode (e.g., a high frequency carrier current riding on a large DC current) and, since sense current $I_S$ is much smaller than the current through sensor heater 80, sensor heater 80 essentially operates in DC mode. In addition, inductor 84 ensures that there is little to no AC leakage to sensor heater 80. Furthermore, this configuration increases the life of sensor 12 by reducing any electromigration risk that may arise if the circuit is operated in DC mode. It should be noted that while a single capacitor 82 and a single inductor 84 are shown, a plurality of capacitors and/or inductors may alternatively be incorporated into the circuit shown.

In FIG. 5D, sensor 12 and sensor heater 80 are connected in series. The heat generated by sensor heater 80 is a function of the voltage drop across sensor heater 80, so the level of heating may be controlled by adjusting the resistance of sensor heater 80 and/or the biasing current provided on connection pads A and B. In alternative embodiments, a plurality of sensor heaters 80 may be connected in series with sensor 12 and arranged in a stacked configuration extending from medium confronting surface 13.

As described above, sensor 12 may be used in various applications related to the HMS of transducing head 10. For example, the output of sensor 12 may be monitored to detect the presence of asperities and other irregularities protruding from the surface of magnetic medium 60. When sensor 12 encounters or collides with an asperity on magnetic medium 60, sensor 12 experiences a sharp increase or spike in temperature resulting from frictional heating associated with the contact forces between sensor 12 and the asperity. This temperature spike results in a detectable change in the resistance across sensor 12. After contact with the asperity, the temperature of sensor 12 may be monitored as it recovers from the contact event and reverts to the normal operating HMS. In this way, transducing head 10 may return to normal operation (and rewrite or reread any skipped or missed data caused by the contact event) after the HMS returns to normal.

Figure 6:
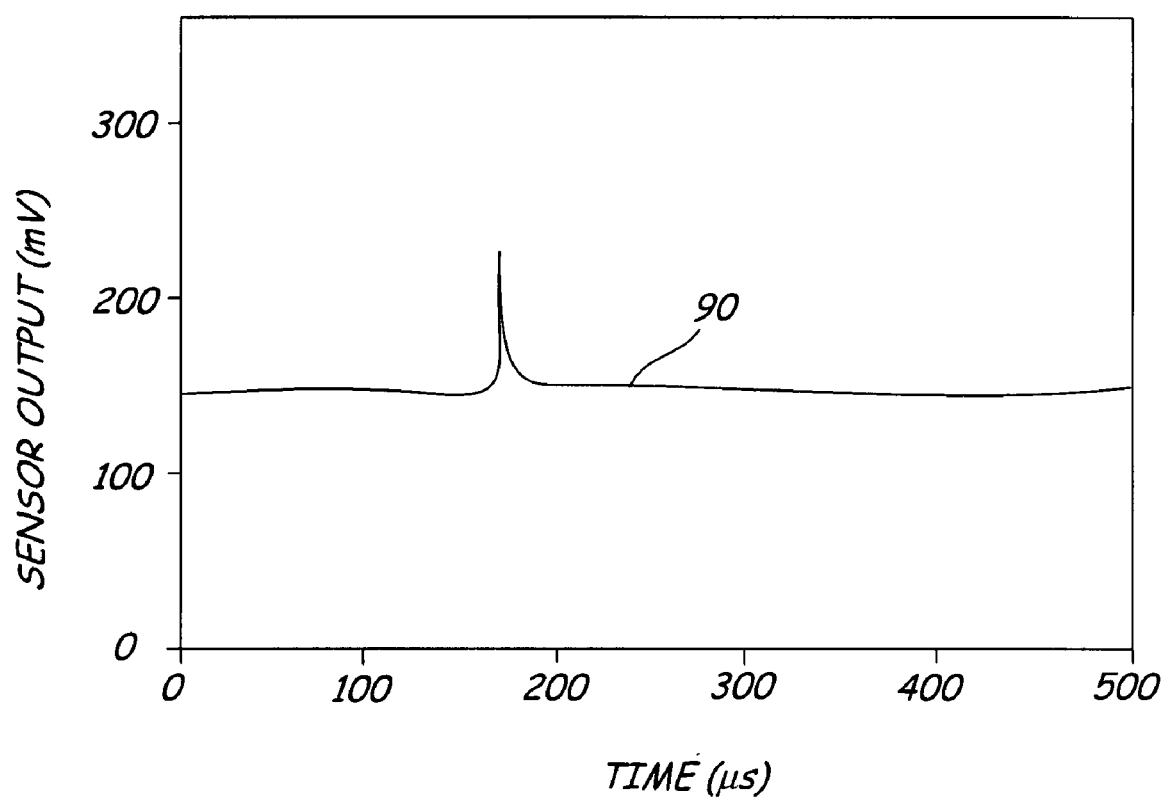
FIG. 6 is a graph of the response of the thermal proximity sensor when it contacts an asperity on a magnetic medium.

FIG. 6 shows the response of sensor 12 to contact with an asperity on magnetic medium 60. In the device tested, sensor 12 was comprised of gold, and sensor 12 came into contact with a 20 nm laser bump formed on magnetic medium 60. Trace 90 shows the sharp increase in voltage across sensor 12 resulting from the thermal spike when sensor 12 contacted the laser bump. Sensor 12 returns to its normal operating voltage after contacting the asperity in less than 20 μs. Consequently, the detection frequency of sensor 12 may be on the order of 1.0 MHz to assure detection of the voltage variation caused by contact with the asperity.

Figure 7:
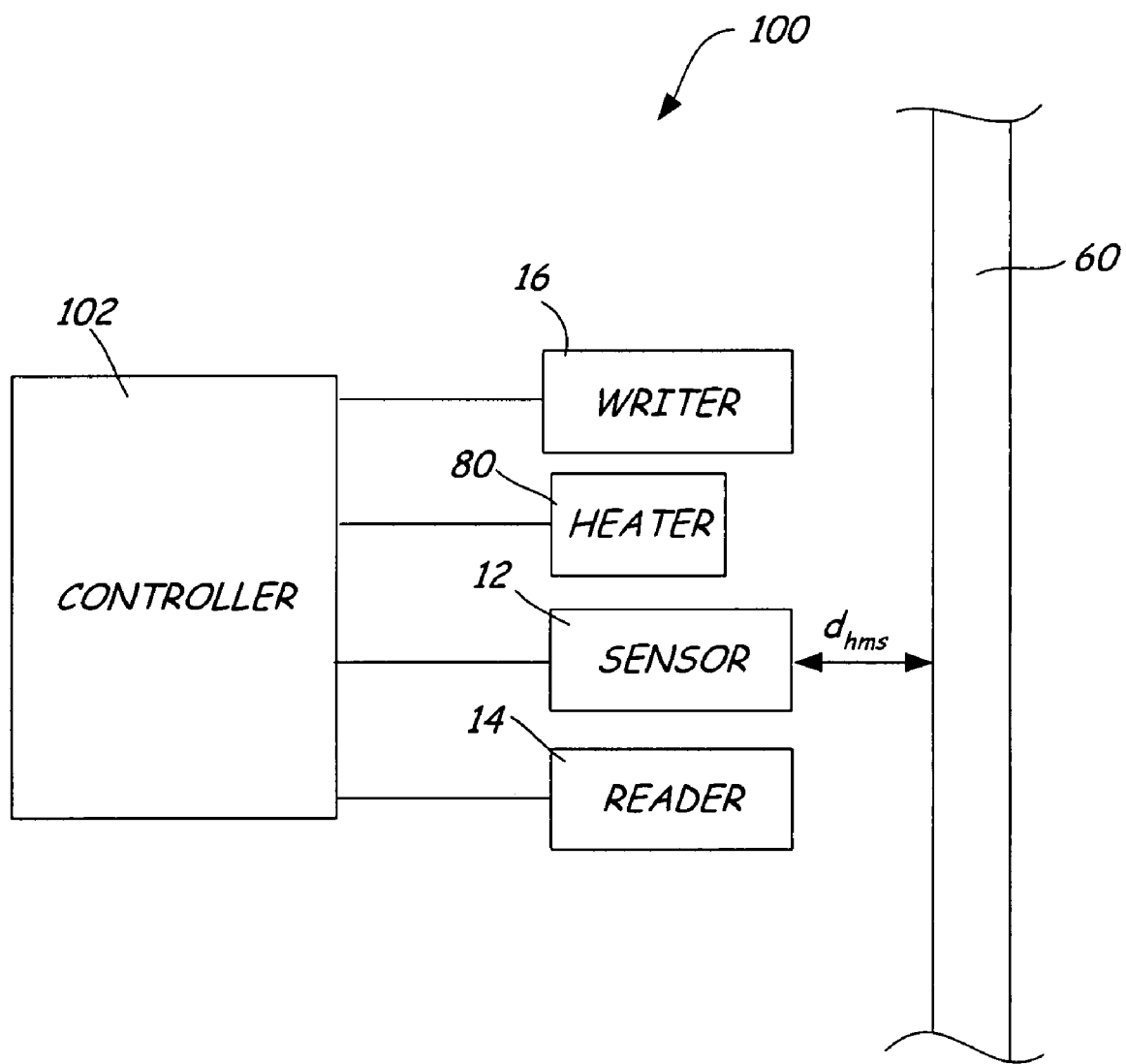
FIG. 7 is a block diagram of a system for providing in-situ control of the head-to-medium spacing based on signals provided by the thermal proximity sensor.

Sensor 12 may also be employed to provide in-situ control of the HMS based on detected thermal variations in sensor 12. FIG. 7 is a block diagram of feedback control system 100 for adjusting the HMS of transducing head 10 in response to changes in the HMS as detected by sensor 12. Control system 100 includes controller 102 for communicating with sensor 12, reader 14, writer 16, and heater 80. Heater 80 generates heat in response to signals from controller 102 to raise the temperature of sensor 12 and main pole tip 48 of writer 16. While a single heater 80 is shown in FIG. 7, separate heaters for sensor 12 and writer 16 may alternatively be provided in control system 100. In addition, each heater may consist of a single or a plurality of heater elements, and may have the configurations described with regard to FIGS. 5A-5D.

In an alternative embodiment, sensor 12 may be connected in parallel with writer 16 such that the same current is applied to sensor 12 and writer 16 during operation. A low pass filter in series with sensor 12 ensures that sensor 12 is operated at a much lower frequency than writer 16. This allows the response of sensor 12 to remain detectably separate from the response of writer 16.

In operation, controller 102 controls operation of reader 14 and writer 16 to read information from and write information to magnetic medium 60. Controller 102 also measures the resistance across sensor 12 to monitor thermal variations caused by changes in HMS. As described above, controller 102 may also increase the sensitivity of sensor 12 by heating sensor 12 with sensor heater 80. Controller 102 may compare the measured resistance across sensor 12 to a stored resistance related to the normal HMS to determine whether the $d_{hms}$ has increased or decreased. Based on this determination, controller 102 controls transducing head 10 to adjust separation $d_{hms}$ back to the normal HMS. In control system 100, controller 102 may accomplish this by operating heater 80 to heat writer 16 (and in particular main pole tip 48). The change in temperature causes the contours of main pole tip 48 to change at medium confronting surface, resulting in a change in the HMS. Since the level of heating of writer 16 may be controlled to produce the desired level of change in the HMS, and because the response time of sensor 12 to changes in the HMS is fast, controller 102 can adjust the HMS to the normal HMS very quickly.

In addition to being able to dynamically control the HMS of transducing head 10, the real-time detection of the HMS with sensor 12 has other applications. For example, controller 102 may monitor the thermal variations in sensor 12 to generate a map of the topography of magnetic medium 60. Thus, because sensor 12 is sensitive to irregularities on magnetic medium 60 at the nanometer level, control system 100 may be used to screen out media with a large number of nano-asperities during media quality certification. In addition, in magnetic recording systems having an air bearing surface, sensor 12 may be employed as a tool to assess the functionality of various air bearing designs by detecting the level of air bearing modulation for each of the designs. Furthermore, lube puddles and other irregularities on magnetic medium 60 may result in an increase in separation $d_{hms}$ (and a corresponding change in the resistance across sensor 12) when transducing head 10 passes over these irregularities, which may lead to poor readability or writability and drive failures in these areas. When this occurs, controller 102 may return to the portion of magnetic medium 60 corresponding to the increase in HMS to reread or rewrite the skipped data. In order to compensate for changes in HMS at the location of the irregularity, controller 102 may activate heater 80 to adjust separation $d_{hms}$ to maintain a constant HMS.

In summary, the present invention relates to a system including a magnetic device for writing to and reading from a magnetic medium and a sensor disposed-adjacent to the magnetic device and proximate to the magnetic medium. The sensor generates signals related to thermal variations in the sensor caused by changes in a distance between the magnetic device and the magnetic medium. By having the sensor as a separate element from the magnetic device, the effectiveness and lifespan of the magnetic device is improved. In addition, the signal generated by the sensor in response to changes in the distance between the magnetic device and the magnetic medium is separate from the signals produced by the magnetic device, making the sensor signals easier to detect and measure. Furthermore, the sensor can provide signals related to the distance between the magnetic device and magnetic medium in-situ, allowing for adjustments to this distance to be made quickly in response to variations in the distance.

Although the present invention has been described with reference to preferred embodiments, workers skilled in the art will recognize that changes may be made in form and detail without departing from the spirit and scope of the invention. For example, while sensor 12 has been described as a single layer of chemically inert material, sensor 12 may alternatively be implemented as a thermocouple junction including two wires made up of two dissimilar metals used as a thermal sensor based on the Seebeck effect.

The invention claimed is:

1. A system comprising:
a magnetic device comprising a main pole for writing to a magnetic medium and a read element for reading from the magnetic medium;
a thermal sensor spaced from the main pole and separate from the read sensor, disposed adjacent to the magnetic device and at or near a medium confronting surface proximate the magnetic medium, wherein the sensor generates signals related to thermal variations caused by changes in a distance between the magnetic device and the magnetic medium, wherein a resistance of the sensor increases in response to the thermal variations, and wherein the increase in resistance is measured by passing a sense current through the sensor;
a heating element for heating the sensor to vary a sensitivity of the sensor to the thermal variations; wherein the sense current passes through the sensor and the heating element in series or in parallel;
an actuator separate from the sensor for varying the distance between the magnetic device and the magnetic medium; and
a controller that controls the actuator to control the distance between the magnetic device and the magnetic medium in response to the sensor signals.

2. The system of claim 1, wherein the sense current passes though the sensor and heating element in series.

3. The system of claim 1, wherein the sense current passes through the sensor and heating element in parallel.

4. The system of claim 1, wherein the sensor further generates signals related to a clearance of the magnetic device from the magnetic medium.

5. The system of claim 1, wherein the sensor is spaced at least 1.0 µm from a tip of the main pole.

6. The system of claim 1, wherein the sensor is comprised of a material having a high thermal coefficient of resistivity and low magnetoresistance.

7. The system of claim 1, wherein the sensor is comprised of an inert material.

8. The system of claim 1, wherein the sensor is embedded in a metallic material.

9. A magnetic recording system comprising:
a magnetic recording device comprising a main pole for writing data to a magnetic medium and a read element for reading data from the magnetic medium, and having a medium confronting surface facing the magnetic medium;
a thermal sensor spaced from the main pole and separate from the read element, disposed adjacent to the magnetic recording device, at or near the medium confronting surface and proximate to the magnetic medium, wherein the sensor generates signals related to thermal variations caused by changes in a distance between the magnetic recording device and the magnetic medium, wherein a resistance of the sensor increases in response to the thermal variations, and wherein the increase in resistance is measured by passing a sense current through the sensor;
a heating element for heating the sensor to vary a sensitivity of the sensor to the thermal variations, wherein the sense current passes through the sensor and heating element in series or in parallel;
an actuator separate from the sensor for varying the distance between the magnetic device and the magnetic medium; and
a controller that controls the actuator to control the distance between the magnetic recording device and the magnetic medium in response to the sensor signals.

10. The magnetic recording system of claim 9, wherein the controller is operable to map a topography of the magnetic medium based on the sensor signals.

11. The magnetic recording system of claim 9, wherein the sensor further generates signals related to a thermal spike caused by contact between the magnetic recording device and asperities on the magnetic medium.

12. The magnetic recording system of claim 9, wherein the distance between the magnetic recording device and the magnetic medium is controlled by heating at least a portion of the magnetic recording device.

13. The magnetic recording system of claim 9, wherein the sensor further generates signals related to a clearance of the magnetic device from the magnetic medium.

14. The magnetic recording system of claim 9, wherein the sense current passes through the sensor and heating element in series.

15. The magnetic recording system of claim 9, wherein the sense current passes through the sensor and heating element in parallel.

16. The magnetic recording system of claim 9, wherein the sensor is spaced at least 1.0 µm from a tip of the main pole.

17. The magnetic recording system of claim 9, wherein the sensor is comprised of a material having a high thermal coefficient of resistivity and low magnetoresistance.

18. The magnetic recording system of claim 9, wherein the sensor is comprised of a noble metal.

19. A system comprising:
- a magnetic device comprising a main pole for writing to a magnetic medium and a read element for reading from the magnetic medium;
- a thermal sensor spaced from the main pole and separate from the read element, disposed adjacent to the magnetic device and at or near a medium confronting surface proximate the magnetic medium, wherein the sensor generates signals related to thermal variations caused by changes in a distance between the magnetic device and the magnetic medium, wherein a resistance of the sensor increases in response to the thermal variations, wherein the increase in resistance is measured by passing a sense current through the sensor, and wherein the sensor is heated by increasing the amplitude of the sense current to increase a sensitivity of the sensor to thermal variations;
- an actuator separate from the sensor for varying the distance between the magnetic device and the magnetic medium; and
- a controller that controls the actuator to control the distance between the magnetic device and the magnetic medium in response to the sensor signals.

20. A magnetic recording system comprising:
- a magnetic recording device comprising a main pole for writing data to a magnetic medium and a read element for reading data from the magnetic medium, and having a medium confronting surface facing the magnetic medium;
- a thermal sensor spaced from the main pole and separate from the read element, disposed adjacent to the magnetic recording device, at or near the medium confronting surface and proximate to the magnetic medium, wherein the sensor generates signals related to thermal variations caused by changes in a distance between the magnetic recording device and the magnetic medium, wherein a resistance of the sensor increases in response to the thermal variations, wherein the increase in resistance is measured by passing a sense current through the sensor, and wherein the sensor is heated by increasing the amplitude of the sense current to increase a sensitivity of the sensor to thermal frictional heating;
- an actuator separate from the sensor for varying the distance between the magnetic device and the magnetic medium; and
- a controller that controls the actuator to control the distance between the magnetic recording device and the magnetic medium in response to the sensor signals.

* * * * *

UNITED STATES PATENT AND TRADEMARK OFFICE
CERTIFICATE OF CORRECTION

PATENT NO. : 7,589,928 B2  Page 1 of 1
APPLICATION NO. : 11/724739
DATED : September 15, 2009
INVENTOR(S) : Mallika Roy et al.

It is certified that error appears in the above-identified patent and that said Letters Patent is hereby corrected as shown below:

Col. 9, Line 67 (Claim 2, Line 2)
  Delete "though"
  Insert --through--

Signed and Sealed this
Twelfth Day of April, 2011

David J. Kappos
*Director of the United States Patent and Trademark Office*